(No Model.)

I. H. KEPLER.
GATE.

No. 337,409. Patented Mar. 9, 1886.

WITNESSES
M. E. Fowler
J. W. Garner

INVENTOR
Isaiah H. Kepler
by C. A. Snowden
Attorneys

N. PETERS, Photo-Lithographer, Washington, D. C.

UNITED STATES PATENT OFFICE.

ISAIAH H. KEPLER, OF NEW HAMPTON, IOWA.

GATE.

SPECIFICATION forming part of Letters Patent No. 337,409, dated March 9, 1886.

Application filed October 22, 1885. Serial No. 180,662. (No model.)

*To all whom it may concern:*

Be it known that I, ISAIAH H. KEPLER, a citizen of the United States, residing at New Hampton, in the county of Chickasaw and State of Iowa, have invented a new and useful Improvement in Gates, of which the following is a specification, reference being had to the accompanying drawings.

My invention relates to an improvement in swinging gates; and it consists in the peculiar construction and combination of devices that will be more fully set forth hereinafter, and particularly pointed out in the claim.

Figure 1:
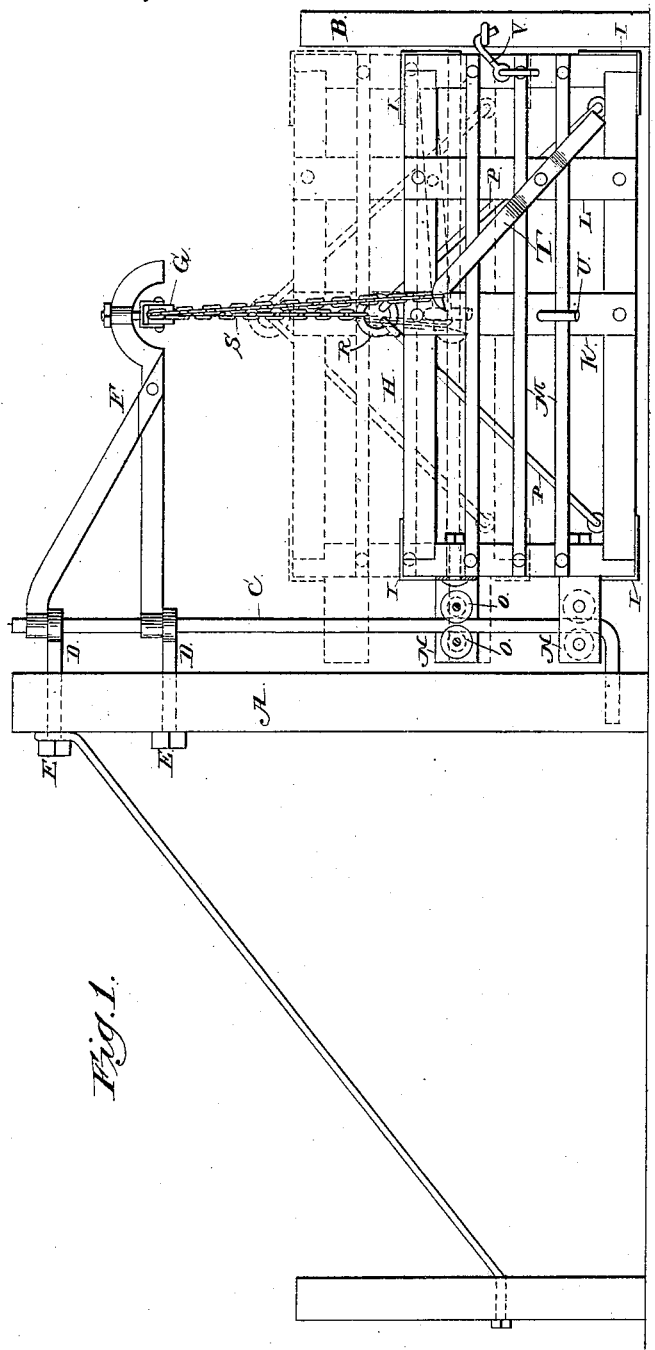
Figure 2:
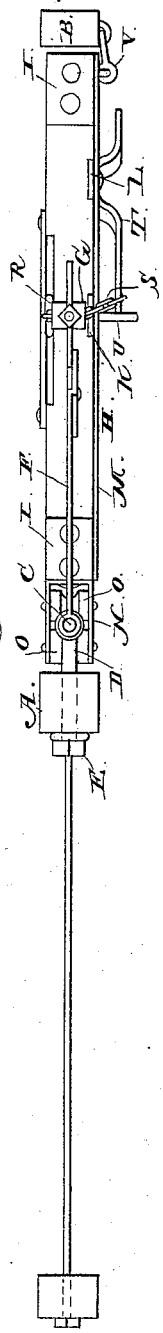

In the drawings, Figure 1 is a side elevation of a gate embodying my invention. Fig. 2 is a top plan view of the same.

A represents the post to which the gate is hung, and B represents the post against which the gate closes. Secured to the former is a vertical rod, C, which is maintained in position at a suitable distance from the post by eyebolts D, having clamp-nuts E on their threaded outer ends. The rod C passes through the eyes of the said bolts, and the lower end of the said rod is bent at right angles and enters the post A near the lower end thereof.

F represents a swinging arm or crane that is hinged on the upper end of the rod C, and is supported by the eyebolts, as shown. To the outer end of the swinging arm is attached a sheave, G.

H represents the gate, which is composed of a rectangular wooden frame mortised together at the corners, and secured by angle-irons I, which are screwed on the outer sides of the corners. A vertical central bar, K, extends across the gate-frame, and in front of the bar K is a similar bar, L. Metallic strips M extend longitudinally across the gate-frame; but barbed wires or boards may be employed for this purpose, if preferred. To the rear side of the gate are bolted brackets N, in which are journaled grooved rollers O, that bear against opposite sides of the rod C, and hinge the gate to said rod, and permit the gate to be readily raised or lowered thereon.

P represents link-bars that are connected at their lower ends to the lower corners of the gate, and approach each other at their upper ends, where they are connected by a hook or open ring, R. The ring and link-bars form a bail to support the gate, and the latter is suspended from the swinging arm by a chain, S, one end of which is hooked to the ring R, and which passes over the sheave G, and has its depending end secured to the hooked end of a lever, T, that is fulcrumed to the gate on the bar L. A downwardly and outwardly extending stop or pin, U, projects from the bar K, under which the hooked end of the lever T is caught when the gate is raised, as shown in dotted lines in Fig. 1. The gate may be lowered by releasing the hooked lever from the stop, as in solid lines, Fig. 1.

The gate is provided with a hook, V, to catch in a staple in the post B, or any ordinary form of latch may be employed, at will.

A gate thus constructed is very easily opened and closed, as it swings freely, and may be raised to swing over a snow-drift, or to permit small animals to pass under it.

No claim is made herein, broadly, to a vertically-movable hinged gate suspended from a swinging arm having a sheave, and a lever pivoted to the gate, and a rope attached to the gate and passed over the sheave and secured to the lever, as this, I am aware, is not novel.

Having thus described my invention, I claim—

The combination of the post A, having the vertical rod C, the swinging arm F, pivoted on the upper end of the said rod and having the sheave G at its outer end, the gate having the brackets N at its inner end, and rollers O in the said brackets, to bear upon and embrace the rod C, and thereby pivot the gate to the said rod, to permit it to be raised or lowered thereon, the bail attached to the lower rail of the gate, the lever fulcrumed to the gate, the stop for the said lever, and the chain hooked to the bail, passed over the sheave, and attached to the lever, to suspend the gate from the swinging arm, substantially as described.

In testimony that I claim the foregoing as my own I have hereto affixed my signature in presence of two witnesses.

ISAIAH H. KEPLER.

Witnesses:
D. A. WEAKLEN,
G. A. STICKNEY.